United States Patent [19]

Blomberg

[11] 4,225,020
[45] Sep. 30, 1980

[54] BRAKING ARRANGEMENT WITH ROTATIONAL RATE OF CHANGE SENSOR

[76] Inventor: Folke I. Blomberg, Duvstigen 4, S-181, 40 Lidingo, Sweden

[21] Appl. No.: 953,792

[22] Filed: Oct. 23, 1978

[51] Int. Cl.³ .............................................. B60T 8/08
[52] U.S. Cl. .............................. 188/181 R; 303/22 R
[58] Field of Search ....................... 188/181 A, 181 R; 303/104, 1.3, 22 R; 310/168; 324/160

[56] References Cited

U.S. PATENT DOCUMENTS

| | | | |
|---|---|---|---|
| 3,663,069 | 5/1972 | Perry et al. | 303/104 |
| 3,725,858 | 4/1973 | Arai et al. | 188/181 R X |
| 4,029,180 | 6/1977 | Gee | 188/181 R |

Primary Examiner—Duane A. Reger

Attorney, Agent, or Firm—Bell, Seltzer, Park & Gibson

[57] ABSTRACT

In the combination of a rotating member such as an automotive vehicle wheel, a brake operative for slowing the rotating member or wheel, and a sensor for signalling any occurrence of an excessive rate of retardation of the rotating member or wheel, an improvement which facilitates optimum response of the sensor by varying the sensitivity or responsiveness of the sensor upon variations in a vehicle operating condition such as the weight imposed on the rotating member or wheel or the braking pressure. In specific forms disclosed, variation in sensitivity of the sensor is accomplished by a variable ratio transmission means mechanically interposed between the sensor and the rotating member or wheel and which is responsive to vehicle operating conditions.

12 Claims, 2 Drawing Figures

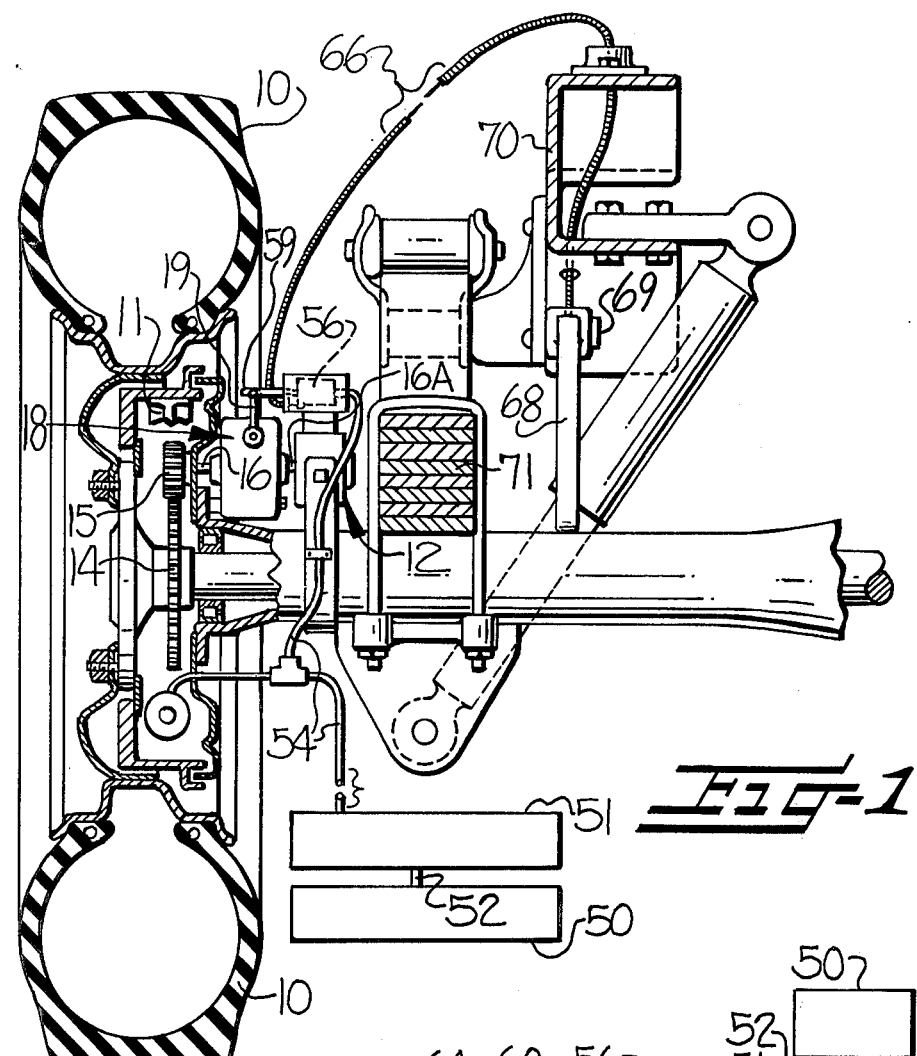
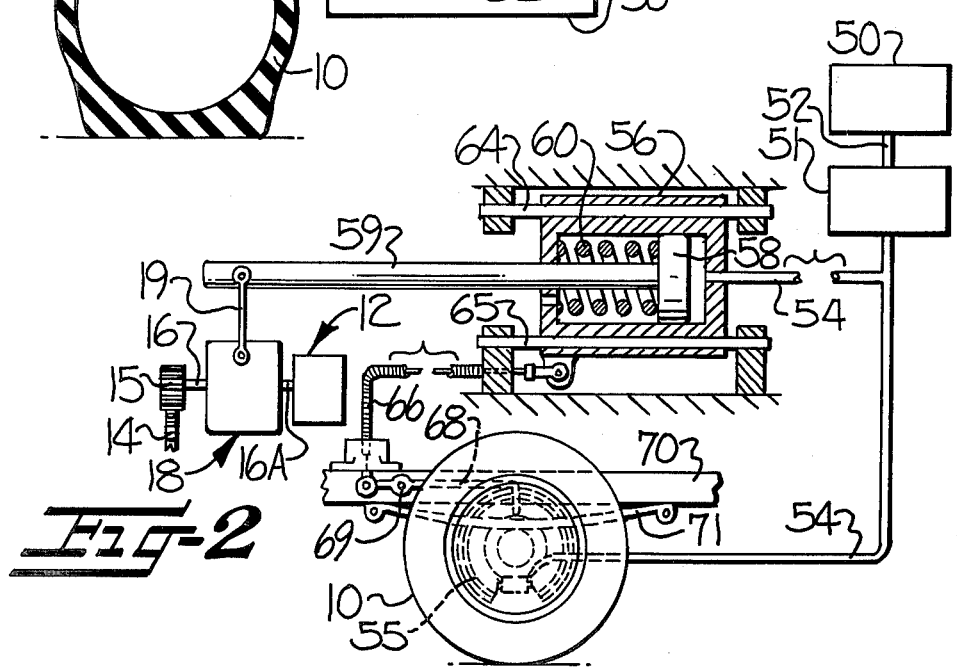

BRAKING ARRANGEMENT WITH ROTATIONAL RATE OF CHANGE SENSOR

TECHNICAL FIELD AND BACKGROUND OF INVENTION

It has been noted as being desirable or necessary in a number of apparatus and processes to sense the rate of change of changing rotational speeds of a rotational element. One example of such a need is found in connection with the use of brakes for slowing a rotating member such as an automotive vehicle wheel. As has been pointed out, sensing the rate of change of changing rotational speeds of a braked rotating member such as an automotive vehicle wheel can be used in conjunction with appropriate arrangements for optimizing braking effects. A variety of approaches to sensing rate of change of changing rotational speeds and/or vehicle wheel slip has been proposed heretofore, as the interested reader will discover from prior patents, references cited therein, and references cited during the prosecution of the applications which resulted in those cited patents. Interested readers are referred to such prior patents for a more complete discussion of a range of types of sensors.

It will be understood that the sensitivity or responsiveness of sensors responsive to wheel slip and/or rates of change of changing rotational speeds of a rotatable element and/or rates of retardation is an important element in determining the performance of any system proposing to obtain control of braking and driving processes. While a competent designer knowledgeable in the arts pertinent to the sensors referred to is able to design and have made and place into use sensors effective to accomplish control by signalling occurences of excessive rates of retardation, it has been heretofore recognized as difficult to accomplish all of substantial sensitivity or responsiveness of a sensor, and ruggedness in use, and optimization of response to varying brake operating conditions. Inevitably, the skilled designer must compromise among the desired goals, with the compromises made favoring certain desired characteristics over other characteristics which are desired but perhaps unattainable.

It has been recognized heretofore that optimal sensitivity or responsiveness of a sensor may be facilitated by rendering the sensor responsive to a vehicle condition. In connection with certain specific sensor structures and methods, it has been recognized that such optimal operation can be facilitated by adjusting spring tensions in such a way as to controllably vary certain normally fixed sensor settings. While such approaches are well adapted to the specific sensor structures for which they have been proposed, it is deemed desirable to facilitate optimal response of sensors irrespective of the specific form of sensor employed.

BRIEF SUMMARY OF INVENTION

With the above discussion particularly in mind, it is an object of the present invention to provide an improvement for the combination of a rotating member, a brake for slowing the rotating member and a sensor for signalling any occurrence of an excessive rate of retardation of the rotating member which facilitates optimizing response of the sensor without regard to the specific form of the sensor. In realizing this object of the present invention, a coupling means is operatively interposed between the sensor and the rotating member and rendered operatively responsive for varying sensitivity or responsiveness of the sensor.

Yet a further object of the present invention is to facilitate improving the responsiveness and sensitivity of a sensor provided in an automotive vehicle and of the type which is mechanically connected to a rotating member such as a vehicle wheel. In realizing this object of the present invention, the coupling means takes the form of a variable ratio transmission means through which rotational movement is transmitted from the rotating member or wheel to the sensor. By varying the ratio of transmission in response to at least one selected vehicle operating condition such as braking pressure conditions and weight load conditions, optimization of sensor response is facilitated.

BRIEF DESCRIPTION OF DRAWINGS

Some of the objects of the invention having been stated, other objects will appear as the description proceeds, when taken in connection with the accompanying drawings, in which FIG. 1 is an elevation view, partially in section and partially schematic, of a braking arrangement in accordance with the present invention; and FIG. 2 is a schematic diagram of the apparatus of FIG. 1.

DETAILED DESCRIPTION OF THE INVENTION

While the present invention will be described hereinafter with particular reference to the accompanying drawings, in which certain forms of the present invention are shown, it is to be recognized at the outset of the following description that persons knowledgeable in the appropriate arts of brake control will be able to depart from the specific arrangements here shown and to be described while still taking advantage of the important characteristics of the present invention. Accordingly, the description which follows is to be understood as a broad teaching of the present invention and not as limiting upon the scope of this invention.

Referring now more particularly to FIG. 1, the present invention is there disclosed in the combination of a rotating member, generally indicated at 10, which takes the particular form of a wheel of an automotive vehicle. A brake is provided, as generally indicated at 11, which is operative for slowing the rotating member. Specific arrangements for brakes for wheels of automotive vehicles are well known to persons skilled in the applicable mechanical arts, and accordingly will not here be described in great detail. A sensor, generally indicated at 12, is operatively coupled to the rotating member 10 for signalling any occurence of an excessive rate of retardation of the wheel. The sensor may, if desired, take the form of those disclosed in U.S. Pat. No. 4,061,212. However, it is specifically contemplated for the present invention that the sensor 12 may take a wide range of other forms known to or conceived by persons skilled in the applicable arts. In the particular form shown, the sensor 12 is operatively mechanically coupled to the rotating member 10 by means of a pair of gears 14, 15 and input shaft 16.

Operatively interposed between sensor 12 and the rotating member 10 is a coupling means generally indicated at 18. In the form illustrated, and as described more particularly hereinafter, the coupling means 18 is a mechanical, variable ratio transmission means for transmitting rotation from the input shaft 16 to an output shaft 16A and thence to the sensor 12. Variable ratio transmission means contemplated as acceptable for use as the coupling means 18 of the present invention may take a variety of different forms known to persons skilled in the applicable mechanical arts, and it is contemplated that a wide range of such mechanisms would be acceptable in the context of the present invention. By way of example only, and not by way of limitation, the variable ratio transmission means may take one of the forms suggested by Arter U.S. Pat. No. 1,718,846; Dodge U.S. Pat. No. 2,164,504; Arter U.S. Pat. No. 2,535,028; or Floyd U.S. Pat. No. 3,071,018, to any one or more of which the interested reader is referred. To any extent necessary to an understanding of this invention, those patents are hereby incorporated by reference.

In the form shown, the coupling means 18 is provided with an operating lever 19 by which the ratio of transmission of rotation through the coupling means 18 may be selectively varied. In accordance with the present invention, the position of the lever 19 is controlled by a vehicle operating condition, in such a manner that the sensor 12 is driven at a rotational speed which is in proportion to the rotational speed to the rotating member 10 or wheel, with the ratio of the proportional sensor rotational speed being varied. In particular, it is contemplated for the arrangement of FIG. 1 that the ratio of proportional sensor rotational speed be governed by a factor which influences brake operation, as pointed out hereinafter.

As herein used, the "sensitivity" or "responsiveness" of a sensor is intended to reflect, at least in part, the so-called g-value of a sensor as related to its use in brake control systems for vehicles is defined with reference to the vehicle speed change which causes an alteration in the rotational speed of a flyweight. High retardation values are stated to correspond to high g-values. Normal g-value settings for sensors usable under good road surface conditions are between 0.7 and 1.5 g, where the average figure for the acceleration of objects in the gravitational field of the earth, namely 9.81 m/sec$^2$, is used as a reference. The meaning of the term "g-value" may also be understood from graphical representations of vehicle speed, flyweight speed, and vehicle wheel speed to be found in prior publications. In such graphs, the slopes of lines indicating speeds, or the negative derivatives thereof, are measures of retardation expressed in appropriate units.

Frictional conditions existing between a wheel and a road surface are one of two important varying factors which, in accordance with the present invention, may have influence on the sensitivity of sensors for a particular vehicle. The second factor is vehicle loading, and FIG. 2 illustrates one particular arrangement in which the two variables can affect the adjustment of a sensor. More particularly, FIG. 2 includes a schematic representation of a source 50 of a pressurized braking fluid, such as a master cylinder supplying pressurized hydraulic oil, and a brake force modulator 51 for controlling vehicle wheel braking effects. An appropriate conduit 52 connects the pressure source 50 with the modulator 51 and a further conduit 54 supplies pressurized braking fluid to a vehicle wheel brake 55. Pressure supplied from the master cylinder 50, whether or not modulated or reduced by the effect of the modulator 51, is supplied through the conduit 52 to a cylinder 56 enclosing a piston 58 which operates a piston rod 59 and is acted on by a return spring 60. The position of the rod 59 controls the position of the operating lever 19 of the coupling means 18. The cylinder 56 is arranged to slide axially along two guides 64, 65. Further, the cylinder 56 is operatively connected with a Bowden wire 66, the other end of which is connected to a lever 68 mounted for movement about a pivot 69, fixed in the frame 70 of the vehicle, in response to relative displacement of a portion of the vehicle frame 70 and the vehicle suspension 71. As vehicle load increases, the vehicle suspension moves relative to the frame, causing movement to be transmitted through the lever 68 and Bowden wire 66 to the cylinder 56.

When the brakes are not actuated and no pressure is transmitted from the master cylinder 50 through the modulator 51 to the brake cylinder 55 of the vehicle wheel and the control cylinder 56, the return spring 60 urges the piston 58 to the right in FIG. 2. When the master cylinder 50 is actuated, braking fluid pressure rises in the cylinder 56, the force applied to the piston 58 overcomes the force of the return spring 60, and the piston 58 and rod 59 are moved (to the left of FIG. 2). A point is reached at an increased brake fluid pressure at which the vehicle wheel tends to lock and the sensor generates a signal to the modulator to lower brake pressure. The brake pressure at which the sensor starts to signal is a measure of the frictional conditions existing between the wheel and the road surface and the system, as here described, has thus adjusted the sensor to a sensitivity suitable for the existing conditions.

Compensation solely in response to braking fluid pressures will be found, in some circumstances, to be sufficient for vehicles such as heavy passenger cars in which wheel pressure does not vary greatly in response to vehicle loading. However, with cargo trucks and small cars of relatively low weight, wheel pressures may vary considerably in response to vehicle load. It is with such vehicles that the efficiency and versatility of a brake control system is substantially enhanced by using both vehicle load conditions and hydraulic braking fluid pressures as control parameters for g-value settings. In such instances and in the arrangement illustrated in FIGS. 1 and 2, it is correct to say that the load dependent adjustment is superposed on the fluid pressure dependent adjustment.

Brake force modulating systems have been proposed for compressed air brake systems in which air pressure is not modulated but a hydraulic system is provided to oppose or counteract the brake force exerted by the "normal" compressed air brake system. The present invention is contemplated as being adaptable to such arrangements, with it being understood that in such arrangements the cylinder 56, piston 58, piston rod 59 and return spring 60 may be replaced by a differential pressure cylinder arrangement in which the piston is balanced between the total air pressure applied to a wheel cylinder and the counteracting hydraulic fluid pressure. In the event that the pressure ranges for the air and hydraulic fluid are of different magnitudes, the cylinder arrangement may employ two interconnected pistons of different diameters in order to accommodate the balancing effect. Normally, the "counteracting" hydraulic fluid pressure would be contemplated as being higher than the "normal" air brake pressure and, for that reason, the piston responding to air brake pressure may be the larger one.

In the drawings and specification, there has been set forth a preferred embodiment of the invention, and although specific terms are employed, they are used in a generic and descriptive sense only and not for purposes of limitation.

What is claimed is:

1. In the combination of a rotating member, a brake operative for slowing the rotating member, and a sensor operatively coupled to the rotating member for signalling any occurrence of an excessive rate of retardation of the rotating member, an improvement which facilitates optimal response of said sensor comprising a variable ratio transmission coupling means operatively interposed between said sensor and said rotating member and operatively responsive to a predetermined operating condition of the rotating member for varying the sensitivity of said sensor upon variations in said condition.

2. In an automotive vehicle having a rotating wheel, a brake operative for slowing the rotating wheel, and a sensor operatively coupled to the wheel for signalling any occurrence of an excessive rate of retardation of the wheel, an improvement which facilitates optimal response of said sensor comprising a variable ratio transmission coupling means operatively interposed between said sensor and said rotating member and operatively responsive to a vehicle operating condition for varying the sensitivity of said sensor upon variations in said condition.

3. Apparatus according to one of claims 1 and 2 wherein said variable ratio transmission means is operatively responsive to a weight load condition for increasing sensor sensitivity upon an increase in weight load.

4. Apparatus according to one of claims 1 and 2 wherein said variable ratio transmission means is operatively responsive to a braking pressure condition for increasing sensor sensitivity upon an increase in braking pressure.

5. Apparatus according to one of claims 1 and 2 wherein said brake comprises a fluid pressure actuated brake cylinder and further wherein said variable ratio transmission means is operatively responsive to both braking fluid pressure and a weight load condition for increasing sensor sensitivity.

6. In the combination of a rotating member, a brake operative for slowing the rotating member, and a sensor mechanically connected to the rotating member for rotation at speeds proportionate to the rotating member speeds and for signalling any occurrence of an excessive rate of retardation of the rotating member, an improvement which facilitates optimal response of said sensor comprising a variable ratio transmission coupling means mechanically interposed between said sensor and said rotating member and operatively responsive to a predetermined operating condition of the rotating member for varying the sensitivity of said sensor upon variations in said condition.

7. In an automotive vehicle having a rotating wheel, a brake operative for slowing the rotating wheel, and a sensor mechanically connected to the rotating wheel for rotation at speeds proportionate to the rotating wheel speeds and for signalling any occurrence of an excessive rate of retardation of the rotating wheel, an improvement which facilitates optimal response of said sensor comprising a variable ratio transmission coupling means operatively interposed between said sensor and said rotating wheel and operatively responsive to a vehicle operating condition for varying the sensitivity of said sensor upon variations in said condition.

8. Apparatus according to one of claims 6 and 7 wherein said variable ratio transmission means is operatively responsive to a weight load condition for varying the ratio of proportional sensor rotational speed.

9. Apparatus according to one of claims 6 and 7 wherein said variable ratio transmission means is operatively responsive to a braking pressure condition for varying the ratio of proportional sensor rotational speed.

10. Apparatus according to one of claims 6 and 7 wherein said brake comprises a fluid pressure actuated brake cylinder and further wherein said variable ratio transmission means is operatively responsive to both braking fluid pressure and a weight load condition for varying the ratio of proportional sensor rotational speed.

11. Apparatus according to one of claims 2 and 7 further comprising suspension means for mounting said rotating wheel and for transferring vehicle weight thereto and wherein said variable ratio transmission means is operatively connected to said suspension means and responsive to the position thereof for varying the ratio of proportional sensor rotational speed.

12. Apparatus according to one of claims 2 and 7 further comprising suspension means for mounting said rotating wheel and for transferring vehicle weight thereto and wherein said variable ratio transmission means is operatively connected to said suspension means and responsive to the position thereof for increasing sensor sensitivity upon an increase in vehicle load.

* * * * *